Patented Jan. 30, 1945

2,368,435

UNITED STATES PATENT OFFICE 2,368,435

ANTIOXIDANT

Percy A. Wells, Abington, and Roy W. Riemenschneider, Glenside, Pa., assignors to Claude R. Wickard, as Secretary of Agriculture of the United States of America and his successors in office No Drawing. Application January 13, 1943, Serial No. 472,280

12 Claims. (Cl. 260—398.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to antioxidants, and one of its objects is the provision of oxidative rancidity inhibitors for oleaginous materials of the glyceride type and other esters of fat acids.

It is common practice to incorporate various antioxidants and preservative agents with fats and oils to inhibit oxidative rancidity, the objectionable odor and flavor imparted to the fats and oils as a result of oxidation by atmospheric oxygen.

It is known that ascorbic acid possesses rancidity-inhibiting properties, and it has been proposed to utilize ascorbic acid as well as its isomers and analogues as antioxidants in aqueous oil emulsion.

Ascorbic acid and other compounds of the ascorbic acid series are, however, substantially insoluble in anhydrous fatty and oily substances, and this property limits their utility as rancidity inhibitors.

We have found that the monoesters obtained from reacting a saturated aliphatic monocarboxylic acid containing from 12 to 18 carbon atoms per molecule with compounds of the ascorbic acid series having the general formula,

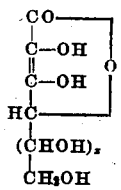

where $x$ is 0 or a whole number not exceeding 3, are fat soluble substances having excellent rancidity-inhibiting properties. The monoesters can be produced by reacting a compound of the ascorbic acid series with the corresponding aliphatic monocarboxylic acid as described in the application for patent Serial No. 442,557, filed May 11, 1942, and in application Serial No. 442,558, filed May 11, 1942. According to the methods disclosed in the aforementioned applications, the monocarboxylic acid and the compound of the ascorbic acid series are dissolved in concentrated sulfuric acid and the mixture is maintained at a suitable temperature, preferably at ordinary room temperature for a length of time necessary to effect esterification, which usually requires 16–20 hours. The monoester is then isolated from the sulfuric acid solution by any suitable procedure; for instance, by dilution with water followed by solvent extraction.

The method of preparing these monoesters is further illustrated by the following examples:

Example I l-ascorbyl palmitate, the palmitic acid monoester of l-ascorbic acid, is prepared by dissolving 8.8 grams of l-ascorbic acid and 10.3 grams of palmitic acid in 100 cc. of 95 percent sulfuric acid at essentially room temperature. The solution is allowed to stand for about 16 hours after which the reaction mixture is poured slowly and with vigorous stirring into about 500 grams of chopped ice. The stirring is continued until the oily phase of the mixture has solidified. The mixture is then extracted with ethyl ether and the ether extract is washed with water until the washings are substantially free of mineral acid. The ether extract is then dried and evaporated to dryness and the residue remaining is powdered and washed by decantation with 200 to 300 cc. of petroleum ether (boiling range 35° to 60° C.), thereby removing unreacted palmitic acid from the reaction product. The white solid residue is insoluble in petroleum ether and consists essentially of ascorbyl monopalmitate. The yield is good.

Example II 8.8 grams of d-isoascorbic acid are esterified with 10.3 grams of palmitic acid in 100 cc. of 95 percent sulfuric acid by the procedure described in Example I. The reaction product after removal of unreacted palmitic acid consists essentially of d-isoascorbyl monopalmitate. The yield is good.

We have also found that certain of these substances, such as the ascorbyl and isoascorbyl monoesters, that is, the monoesters obtained by using in the reaction compounds of the ascorbic acid series having the structural formulas,

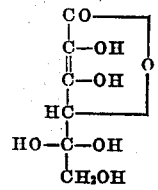
Ascorbic acid and

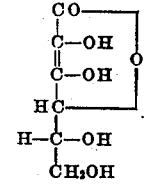
Isoascorbic acid are antioxidants especially well suited for use in edible fats and oils.

This use is illustrated by the test procedures and tabulated results set forth below.

A number of 20 cc. samples of fatty materials containing varying amounts of the esters dissolved therein were placed in 50 cc. low form glass beakers, covered with watch glasses and kept in an oven, the temperature of which was maintained at 100° C. (±0.5° C.) by means of a thermostatically controlled heating device. At regular intervals the samples were examined for rancid odor. These organoleptic examinations for rancidity were checked by tests for peroxide content, using the well-known method based upon determination of free iodine liberated from potassium iodide by the peroxide-like oxidation products formed in the fatty materials. Thus, for lard the rancid odor became detectable when the peroxide content reached a value of 10 milli-mols (20 milli-equivalents) per kilogram of fat; for alkali refined peanut oil the odor was noticeable at 35 milli-mols; for alkali refined cottonseed oil at 40 milli-mols, and so on.

The results obtained are shown by the tabulation which follows. The stability of the tested materials as given in the table is the length of time the fatty materials remained under the above-indicated conditions before the atmospheric oxidation proceeded far enough to impart a detectable rancid odor to the material.

palmitate. No differences in taste or texture of the two lots of biscuits were observed. Stability tests on the dry, finely crumbled biscuits were carried out by using the oven test at 60° C. After thirteen and one-half days the control biscuit was rancid while the biscuit containing the antioxidant had only a stale odor. The fat extracted from the control biscuit had a peroxide value of 42; the fat from the test biscuit had a peroxide value of 20.

Similar results are obtained by using as rancidity-inhibiting agents other monoesters of fatty acids containing from 12 to 18 carbon atoms per molecule with various compounds of the ascorbic acid series such as ascorbic acids, isoascorbic acids, glucoascorbic acid, araboascorbic acid and the like, or the mixed monoesters obtained by esterification of commercial mixed fat acids. While in the foregoing description, the invention is illustrated as applied to the stabilization of lard, peanut oil, cottonseed oil and vegetable shortenings, the invention is applicable to the stabilization of any oleaginous material comprising glycerides or other esters of fat acids.

Having thus described our invention, we claim:

1. The method of inhibiting animal and vegetable fats and oils against oxidative rancidity comprising incorporating therewith a monoester of a fatty acid containing from 12 to 18 carbon atoms per molecule and a compound of the ascorbic acid series.

| Substrate | Preserving agent used | Concentration of the preserving agent in per cent | Stability in hours | Antioxidant effect in hours |
|---|---|---|---|---|
| Lard | None | | 7 | |
| Do | d-Isoascorbyl palmitate | 0.05 | 14 | 7 |
| Do | do | 0.24 | 28 | 21 |
| Do | do | 0.59 | 73 | 66 |
| Do | d-Isoascorbyl laurate | 0.10 | 16 | 9 |
| Do | d-Isoascorbyl myristate | 0.11 | 14 | 7 |
| Do | d-Isoascorbyl palmitate | 0.12 | 15 | 8 |
| Do | d-Isoascorbyl stearate | 0.13 | 15 | 8 |
| Do | l-Ascorbyl palmitate | 0.05 | 10 | 3 |
| Do | do | 0.24 | 25 | 18 |
| Do | do | 0.59 | 90 | 83 |
| Do | do | 0.83 | 150 | 143 |
| Do | l-Ascorbyl laurate | 0.10 | 15 | 8 |
| Do | l-Ascorbyl myristate | 0.11 | 17 | 10 |
| Do | l-Ascorbyl palmitate | 0.12 | 15 | 8 |
| Do | l-Ascorbyl stearate | 0.13 | 15 | 8 |
| Peanut oil | None | | 34 | |
| Do | d-Isoascorbyl palmitate | 0.05 | 56 | 22 |
| Do | do | 0.242 | 76 | 42 |
| Do | do | 0.592 | 92 | 58 |
| Do | do | 0.05 | 58 | 24 |
| Do | do | 0.24 | 78 | 44 |
| Do | do | 0.59 | 97 | 63 |
| Cottonseed oil | None | | 18 | |
| Do | d-Isoascorbyl palmitate | 0.05 | 42 | 24 |
| Do | do | 0.24 | 76 | 58 |
| Do | do | 0.59 | 117 | 99 |
| Do | l-Ascorbyl palmitate | 0.052 | 48 | 30 |
| Do | do | 0.242 | 82 | 64 |
| Do | do | 0.592 | 123 | 105 |
| Vegetable shortening C | None | | 21 | |
| Do | d-Isoascorbyl palmitate | 0.05 | 50 | 29 |
| Do | do | 0.24 | 77 | 56 |
| Do | do | 0.83 | 203 | 182 |
| Do | l-Ascorbyl palmitate | 0.05 | 50 | 29 |
| Do | do | 0.24 | 67 | 46 |
| Do | do | 0.83 | 133 | 112 |
| Vegetable shortening S | None | | 32 | |
| Do | d-Isoascorbyl palmitate | 0.05 | 57 | 25 |
| Do | do | 0.24 | 77 | 45 |
| Do | do | 0.83 | 154 | 122 |
| Do | l-Ascorbyl palmitate | 0.05 | 54 | 22 |
| Do | do | 0.24 | 73 | 41 |
| Do | do | 0.83 | 148 | 116 |

To determine whether lard containing monoester of compounds of the ascorbic acid series is satisfactory for baking purposes, biscuits were prepared by a standard recipe in which the shortening consisted of lard containing 1.0 percent of l-ascorbyl palmitate. For comparison, biscuits were made in an identical manner using the same lard without the addition of l-ascorbyl 2. The method of inhibiting animal and vegetable fats and oils against oxidative rancidity comprising incorporating therewith a monoester of a saturated aliphatic monocarboxylic acid containing from 12 to 18 carbon atoms per molecule and a compound of the ascorbic acid series.

3. The method of inhibiting animal and vegetable fats and oils against oxidative rancidity comprising incorporating therewith an ascorbyl monoester of a saturated aliphatic monocarboxylic acid containing from 12 to 18 carbon atoms per molecule.

4. The method of inhibiting animal and vegetable fats and oils against oxidative rancidity comprising incorporating therewith an isoascorbyl monoester of a saturated aliphatic monocarboxylic acid containing from 12 to 18 carbon atoms per molecule.

5. An oleaginous composition comprising animal and vegetable fats and oils having incorporated therein in an amount sufficient to inhibit rancidity development a monoester of a fatty acid containing 12 to 18 carbon atoms per molecule and a compound of the ascorbic acid series.

6. An oleaginous composition comprising animal and vegetable fats and oils having incorporated therein in an amount sufficient to inhibit rancidity development a monoester of a saturated aliphatic monocarboxylic acid containing from 12 to 18 carbon atoms per molecule and a compound of the ascorbic acid series.

7. An oleaginous composition comprising animal and vegetable fats and oils having incorporated therein in an amount sufficient to inhibit rancidity development an ascorbyl monoester of a saturated aliphatic monocarboxylic acid containing from 12 to 18 carbon atoms per molecule.

8. An oleaginous composition comprising animal and vegetable fats and oils having incorporated therein in an amount sufficient to inhibit rancidity development an isoascorbyl monoester of a saturated aliphatic monocarboxylic acid containing 12 to 18 carbon atoms per molecule.

9. The method of inhibiting animal and vegetable fats and oils against oxidative rancidity comprising incorporating therewith a monoester of a fatty acid containing from 12 to 18 carbon atoms per molecule and a compound having the formula

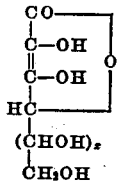

where $x$ is 0 or a whole number not exceeding 3.

10. The method of inhibiting animal and vegetable fats and oils against oxidative rancidity comprising incorporating therewith a monoester of a saturated aliphatic monocarboxylic acid containing from 12 to 18 carbon atoms per molecule and a compound having the formula

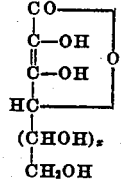

where $x$ is 0 or a whole number not exceeding 3.

11. An oleaginous composition comprising animal and vegetable fats and oils having incorporated therein in an amount sufficient to inhibit rancidity development a monoester of a fatty acid containing 12 to 18 carbon atoms per molecule and a compound having the formula

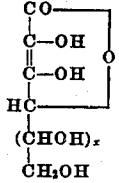

where $x$ is 0 or a whole number not exceeding 3.

12. An oleaginous composition comprising animal and vegetable fats and oils having incorporated therein in an amount sufficient to inhibit rancidity development a monoester of a saturated monocarboxylic acid containing 12 to 18 carbon atoms per molecule and a compound having a formula

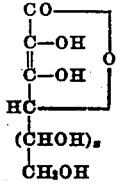

where $x$ is 0 or a whole number not exceeding 3.

PERCY A. WELLS.
ROY W. RIEMENSCHNEIDER.